US007748279B2

(12) United States Patent
Budde et al.

(10) Patent No.: US 7,748,279 B2
(45) **Date of Patent: *Jul. 6, 2010**

(54) HYDRAULICS MANAGEMENT FOR BOUNDED IMPLEMENTS

(75) Inventors: Steven C Budde, Dunlap, IL (US); Brian D Hoff, East Peoria, IL (US); Benjamin Schmuck, Glen Ellyn, IL (US)

(73) Assignee: Caterpillar Inc, Peoria, IL (US)

( * ) Notice: Subject to any disclaimer, the term of this patent is extended or adjusted under 35 U.S.C. 154(b) by 278 days.

This patent is subject to a terminal disclaimer.

(21) Appl. No.: 11/864,564

(22) Filed: Sep. 28, 2007

(65) Prior Publication Data

US 2009/0084192 A1 Apr. 2, 2009

(51) Int. Cl.
*G01F 1/74* (2006.01)

(52) U.S. Cl. .................................................. 73/861.04

(58) Field of Classification Search .................. 701/50; 60/459, 422

See application file for complete search history.

(56) References Cited

U.S. PATENT DOCUMENTS

| | | | |
|---|---|---|---|
| 4,000,751 | A | 1/1977 | Henninghaus |
| 4,074,528 | A | 2/1978 | Lourigan et al. |
| 4,437,307 | A | 3/1984 | Budzich |
| 4,966,066 | A | 10/1990 | Kauss et al. |
| 5,167,121 | A | 12/1992 | Sepheri et al. |
| 5,182,908 | A | 2/1993 | Devier et al. |
| 5,490,384 | A | 2/1996 | Lunzman |
| 5,678,470 | A | 10/1997 | Koehler et al. |
| 6,282,891 | B1 | 9/2001 | Rockwood |
| 6,289,675 | B1 | 9/2001 | Herfs et al. |
| 6,321,535 | B2 | 11/2001 | Ikari et al. |
| 6,393,838 | B1 | 5/2002 | Moriya et al. |
| 6,522,964 | B1 | 2/2003 | Miki et al. |
| 6,662,705 | B2 | 12/2003 | Huang et al. |
| 6,769,348 | B2 | 8/2004 | Hudson et al. |
| 6,931,847 | B1 | 8/2005 | Throckmorton et al. |
| 7,146,808 | B2 | 12/2006 | Devier et al. |

(Continued)

FOREIGN PATENT DOCUMENTS

| | | |
|---|---|---|
| CN | 2767508 Y | 3/2006 |

(Continued)

OTHER PUBLICATIONS

U.S. Appl. No. 11/864,547, Budde et al, filed Sep. 28, 2007.*

*Primary Examiner*—Jewel Thompson
(74) *Attorney, Agent, or Firm*—Leydig, Voit & Mayer

(57) ABSTRACT

A method of allocating hydraulic fluid between actuators in a machine accepts a first command to provide a first requested fluid flow to a first actuator, wherein the first actuator is a bounded actuator such as a steering actuator, and a second command to provide a second requested fluid flow to a second actuator. The system adjusts the first and second commands to produce adjusted first and second commands corresponding to adjusted first and second fluid flows, such that the sum of the adjusted first and second fluid flows is less than or equal to a maximum available flow and the adjusted first fluid flow meets or exceeds the lesser of the first requested fluid flow and a threshold curve that is a function of engine speed or other variable.

20 Claims, 6 Drawing Sheets

U.S. PATENT DOCUMENTS

2001/0008068 A1 7/2001 Ikari et al.
2002/0087244 A1 7/2002 Dix et al.
2006/0090459 A1 5/2006 Devier et al.
2006/0112685 A1 6/2006 Devier et al.
2006/0218912 A1 10/2006 Price et al.
2006/0245881 A1 11/2006 Biggerstaff et al.

FOREIGN PATENT DOCUMENTS

JP 2007247731 9/2007

* cited by examiner

HYDRAULICS MANAGEMENT FOR BOUNDED IMPLEMENTS

TECHNICAL FIELD

The present disclosure relates generally to a hydraulic system, and more particularly, to a hydraulic system having configurable flow control correlated to work tool selection.

BACKGROUND

Many machines use multiple hydraulic actuators to accomplish a variety of tasks. Examples of such machines include without limitation dozers, loaders, excavators, motor graders, and other types of heavy machinery. The hydraulic actuators in such machines are linked via fluid flow lines to a pump associated with the machine to provide pressurized fluid to the hydraulic actuators. Chambers within the various actuators receive the pressurized fluid in controlled flow rates and/or pressures in response to operator demands or other signals. Although most such machines are deigned to allow multiple actuators to be used simultaneously, in certain circumstances the demanded fluid flow will exceed the output capabilities of the fluid pump, especially when a single such pump is used. In the event that a flow of fluid supplied to one of the actuators is less than what is demanded by the machine operator or control system, the affected actuator may respond too slowly, too gently, or otherwise behave in an unexpected manner.

Given this problem, various solutions have evolved in the art. One method of accommodating a demand for fluid flow that is greater than the capacity of an associated pump is described in U.S. Appl. 20060090459 by Devier et al. entitled "Hydraulic System Having Priority Based Flow Control" ("the '459 application"). The '459 application describes a hydraulic system controller that is configured to receive input indicative classifying a plurality of fluid actuators as being either of a first or a second type. When an input indicative of a desired flow rate for the plurality of fluid actuators is received, the controller determines a current flow rate of the source. If all demanded flow rates can be met, the controller demands this amount of flow. Otherwise, the controller demands the desired flow rate only for the first type of fluid actuator and scales down the desired flow rate for the second type of fluid actuator. When the desired flow rate just for the first type of fluid actuators alone exceeds the current flow rate of the source, the controller scales down the desired flow rate for all of the fluid actuators. Thus there are three regimes in which the controller of the '459 application operates.

The disclosed hydraulic system is directed to overcoming one or more of the problems set forth above. It should be appreciated that the foregoing background discussion is intended solely to aid the reader. It is not intended to limit the disclosure or claims, and thus should not be taken to indicate that any particular element of a prior system is unsuitable for use, nor is it intended to indicate any element, including solving the motivating problem, to be essential in implementing the examples described herein or similar examples.

BRIEF SUMMARY

The disclosure describes, in one aspect, a method of allocating hydraulic fluid between actuators in a machine accepts a first command to provide a first requested fluid flow to a first actuator, wherein the first actuator is a bounded actuator, the fluid flow of which is constrained between an upper and lower bound, and a second command to provide a second requested fluid flow to a second actuator that is not bounded. The system adjusts the first and second commands to produce adjusted first and second commands corresponding to adjusted first and second fluid flows, such that the sum of the adjusted first and second fluid flows is less than or equal to a maximum available flow and the adjusted first fluid flow meets or exceeds the lesser of the first requested fluid flow and a threshold curve that is a function of engine speed.

Other aspects, features, and embodiments of the described system and method will be apparent from the following discussion, taken in conjunction with the attached drawing Figures.

DETAILED DESCRIPTION

This disclosure relates to a system and method for controlling a flow of hydraulic fluid in a plurality of parallel circuits in a machine. In particular, a controller applies one or more thresholds to control the flow priority among parallel circuits when the flow demanded for all circuits exceeds the available flow, e.g., from a hydraulic p-ump of the machine. Although the disclosure pertains to machines having more than one pump, the disclosed techniques are particularly advantageous in machines where only a single pump is available. The use of a single pump is often driven by machine size, engine power limitations, or cost requirements, and it is especially important to provide appropriately managed hydraulic fluid flows in such a machine to prevent inadequate machine performance.

Figure 1:
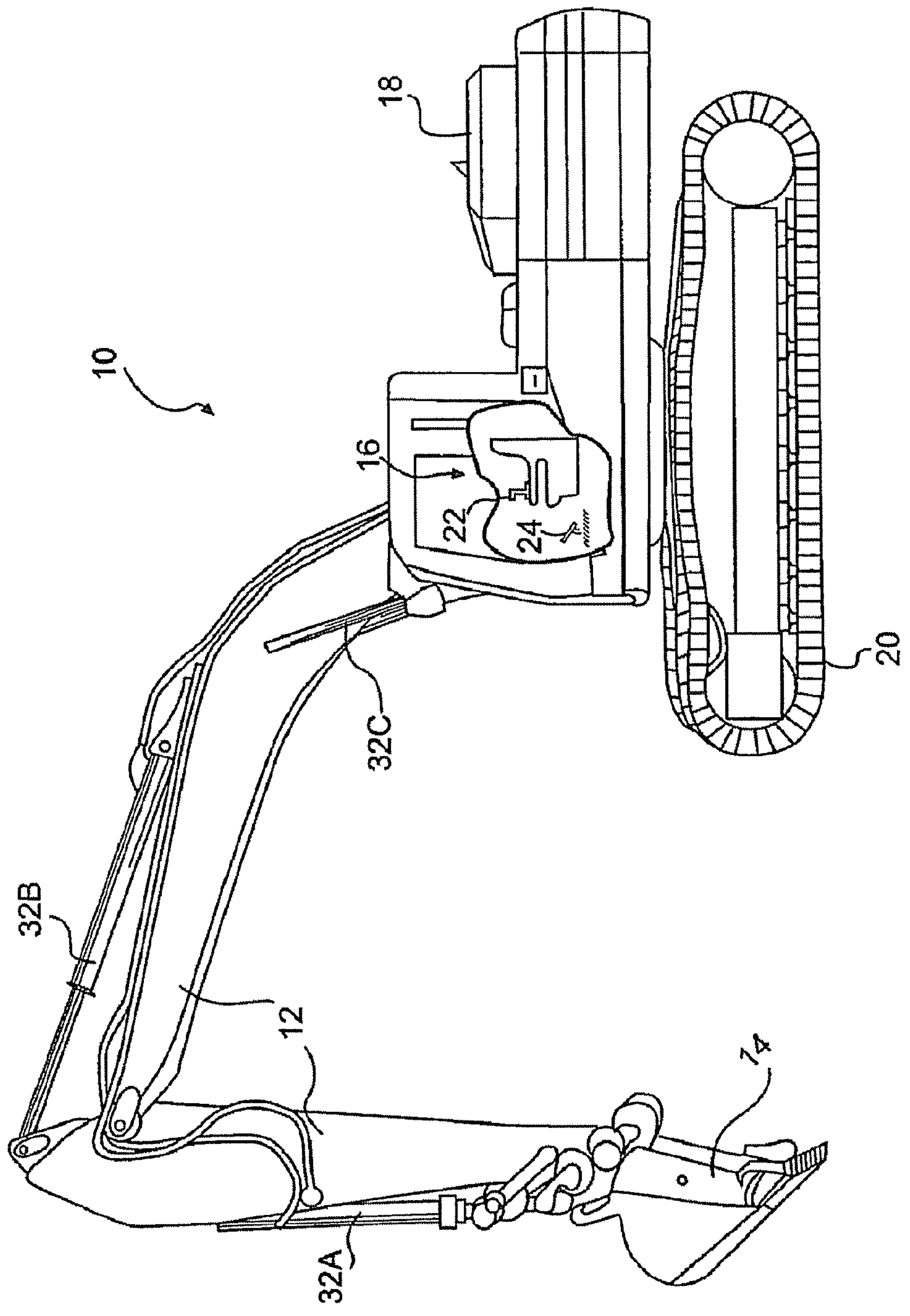
FIG. 1 is a side-view diagrammatic illustration of an exemplary disclosed machine.

FIG. 1 illustrates an example machine 10. Machine 10 may be a stationary or mobile machine and assist in operations associated with mining, construction, farming, and other industries and environments. Machines that employ hydraulic circuits include excavators, dozers, loaders, backhoes, motor graders, and dump trucks, as well as many other machine types. In the illustrated example, machine 10 includes a frame 12, at least one implement or tool 14, an operator interface 16, a power source 18, and at least one traction device 20.

Frame 12 generally includes a structural unit that supports movement of the machine 10 and/or the tool 14. Frame 12 may be, for example, a stationary base frame connecting power source 18 to traction device 20, a movable frame member of a linkage system, or other frame system known in the art.

Tool 14 can be one of any number of devices used in the machine-assisted performance of a task. For example, tool 14 could comprise a bucket, blade, shovel, ripper, dump bed, hammer, auger, or other suitable task-performing device.

Tool 14 may be manipulable to pivot, rotate, slide, swing, or move relative to frame 12 in a manner known in the art.

Operator interface 16 is generally configured to receive input from a machine operator, indicating a desired movement of the machine 10 and/or tool 14. In addition, the input to move the machine 10 and/or tool 14 may additionally or alternately be a computer-generated command from an automated system.

In the illustrated example, the operator interface 16 includes a first operator interface device 22 and a second operator interface device 24. For example, the first operator interface device 22 may include a multi-axis joystick located to one side of an operator station, and may be a proportional controller configured to position and/or orient tool 14. In this arrangement, a movement speed of tool 14 is related to an actuation position of the first operator interface device 22 about an actuation axis.

The second operator interface device 24 may include, for example, a throttle pedal configured for actuation by an operator's foot, and may also be a proportional controller as well, configured to control a driving rotation of traction device 20. In this arrangement, a rotational speed of traction device 20 is related to an actuation position of the second operator interface device 24. It is contemplated that additional or different operator interface devices will often also be included within operator interface 16. For example, wheels, knobs, push-pull devices, switches, and other operator interface devices known in the art may be included in the operator interface 16.

The power source 18 is typically an engine such as, for example, a diesel engine, a gasoline engine, a natural gas engine, or other engine known in the art, although the power source 18 may alternately comprise another source of power such as a fuel cell, power storage device, electric motor, or another source of power known in the art. In the illustrated example, traction device 20 includes tracks located on each side of machine 10 (one side shown). However, traction device 20 could also include wheels, belts, or other traction devices. Traction device 20 may or may not be steerable.

Figure 2:
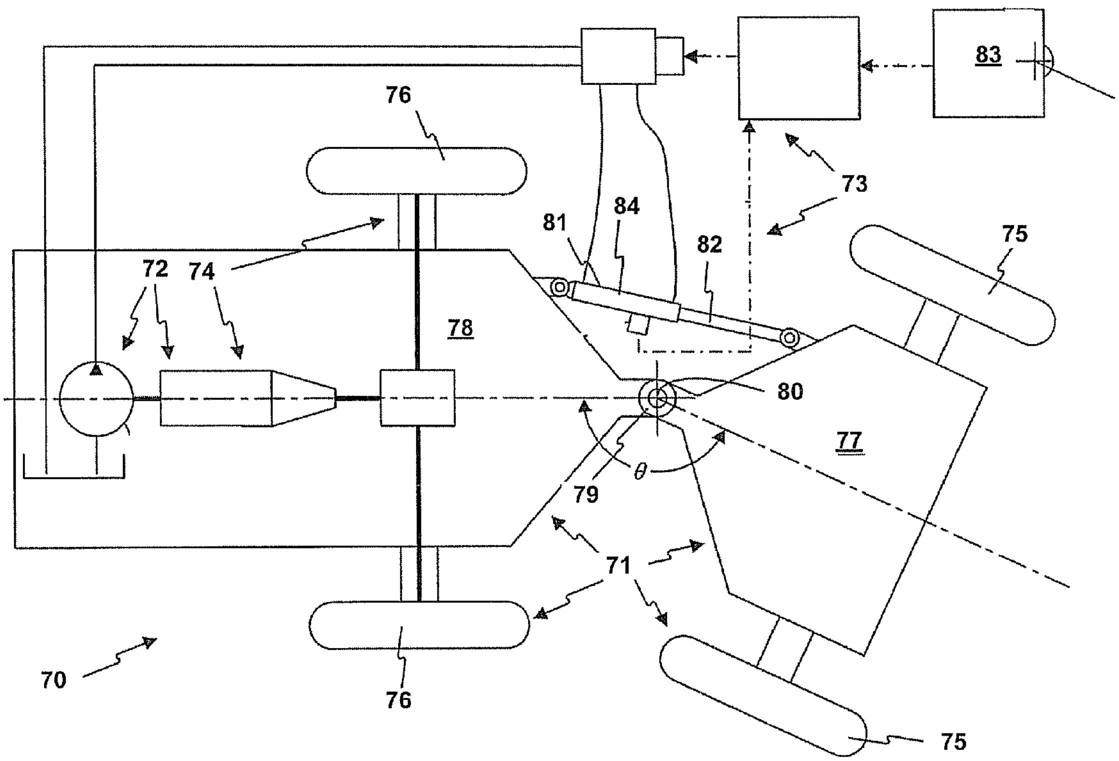
FIG. 2 is a schematic top-view of an exemplary disclosed machine.

Although the foregoing example relates to a certain type of machine, other types of machines may implement the present examples as well. The mobile machine 70 illustrated in FIG. 2 is a wheel loader system that includes moveable components 71, a power source 72 for providing power to move moveable components 71, and controls 73 for controlling the motion of moveable components 71. The mobile machine 70 includes a propulsion system 74. Moveable components 71 include steering devices 75, 76 that transmit steering forces to steer mobile machine 70. The steering devices 75, 76 are wheels in the illustrated example, but may additionally or alternatively comprise other types of devices. Moveable components 71 may include components that connect to steering devices 75, 76 and allow adjustment of a steering angle θ between steering devices 75 and steering devices 76. For example, moveable components 71 may include a frame section 77 to which steering devices 75 mount and a frame section 78 to which steering devices 76 mount. A pivot joint 79 between frame sections 77, 78 may allow adjustment of steering angle θ by allowing frame sections 77, 78 to pivot relative to one another about an axis 80.

Power source 72 supplies pressurized hydraulic fluid to hydraulic cylinder with housing 81 and drive member 82. Controls 73 will typically though not invariably include an operator-input device 83, provisions for gathering information about the motion of moveable components 71 and/or actuator 84, and provisions for controlling actuator 84. Actuator 84 may be a linear actuator, a rotary actuator, or a type of actuator that generates motion other than purely rotational or linear motion.

Actuator 84 is drivingly connected to moveable components 71. For example, as FIG. 2 shows, actuator 84 may be directly drivingly connected to each frame section 77, 78 and, through each frame section 77, 78, indirectly drivingly connected to steering devices 75, 76. This allows actuator 84 to drive frame sections 77, 78 and steering devices 75, 76. In some embodiments, actuator 84 is connected to frame sections 77, 78 in a manner that enables actuator 84 to adjust steering angle θ by pivoting frame section 77 and steering devices 75 about axis 80 relative to frame section 78 and steering devices 76.

Figure 3:
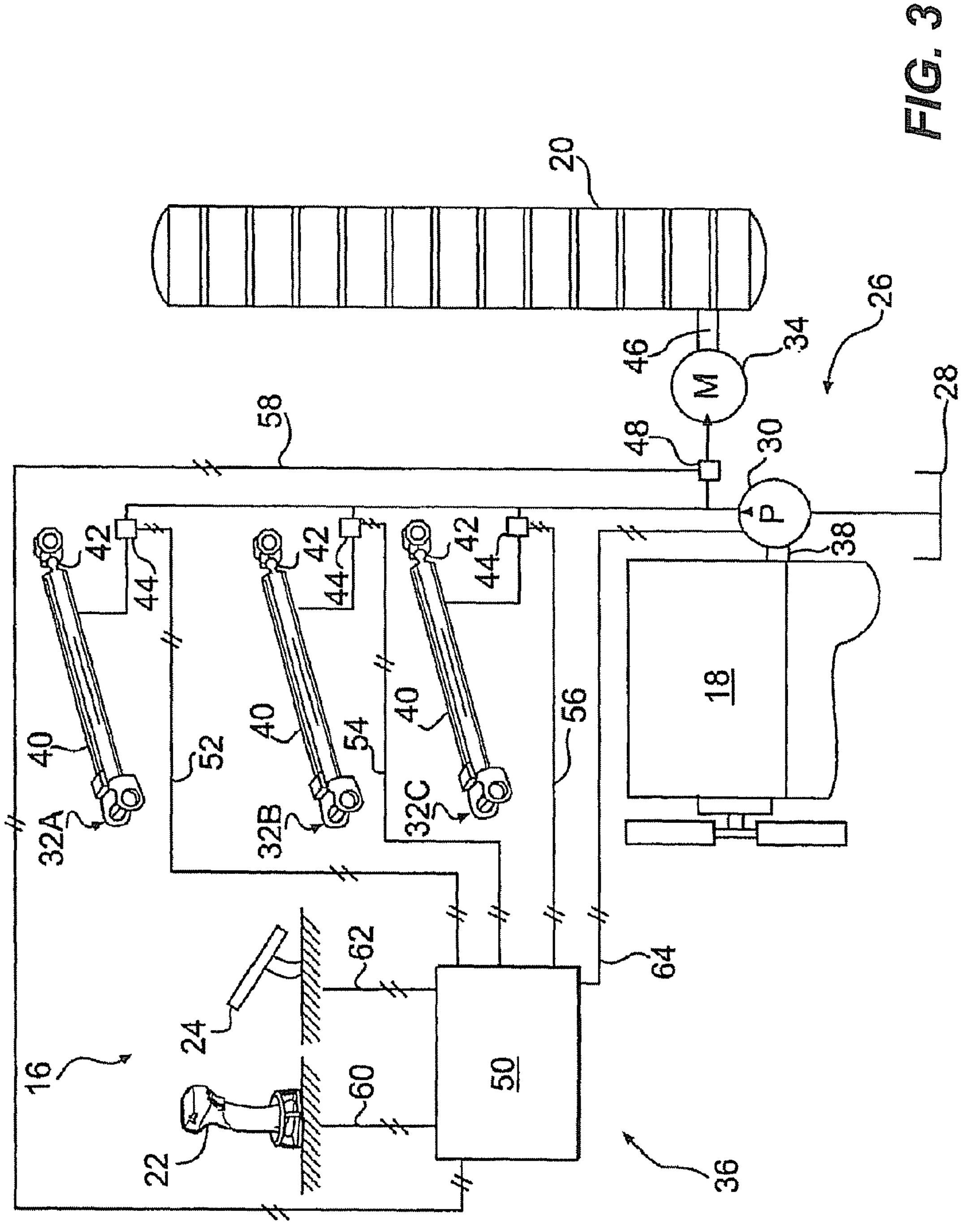
FIG. 3 is a schematic system illustration of an exemplary disclosed hydraulic system for a machine such as illustrated in FIGS. 1 and 2.

Although the following discussion makes reference primarily to the machine 10 of FIG. 1, it will be appreciated that the same hydraulic and mechanical principles apply equally to other machines such as that illustrated in FIG. 2 and others. As more generally illustrated in FIG. 3, the machine 10 includes a hydraulic system 26 having a plurality of fluid components that cooperate together to move tool 14 and/or propel machine 10. Specifically, hydraulic system 26 includes a tank 28 for holding a supply of fluid and a source 30 configured to pressurize the fluid and to direct the pressurized fluid to one or more hydraulic cylinders 32*a-c,* to one or more fluid motors 34, and/or to any other additional fluid actuator known in the art. Hydraulic system 26 also includes a control system 36 in communication with some or all of the components of hydraulic system 26. Although not shown, it is contemplated that hydraulic system 26 will generally include other components as well such as, for example, accumulators, restrictive orifices, check valves, pressure relief valves, makeup valves, pressure-balancing passageways, and other components known in the art.

The fluid in tank 28 comprises, for example, a specialized hydraulic oil, an engine lubrication oil, a transmission lubrication oil, or other suitable fluid known in the art. One or more hydraulic systems within machine 10 draw fluid from and return fluid to tank 28. In an embodiment, hydraulic system 26 is connected to multiple separate fluid tanks.

Source 30, also referred to herein as a fluid pump, produces a pressurized flow of fluid and may comprise a variable displacement pump, a fixed displacement p-ump, a variable delivery pump, or other source of pressurized fluid. Source 30 may be connected to power source 18 by, for example, a countershaft 38, a belt (not shown), an electrical circuit (not shown), or in other suitable manner, or may be indirectly connected to power source 18 via a torque converter, a gear box, or in other appropriate system. As noted above, multiple sources of pressurized fluid may be interconnected to supply pressurized fluid to hydraulic system 26.

In the disclosed technique, it is often useful to be able to measure the flow of fluid provided by source 30. A flow rate available from source 30 may be determined, e.g., by sensing an angle of a swash plate within source 30, by observing a command sent to source 30, or by other suitable means. The flow rate may alternately be determined by a flow sensor such as a coriolis sensor or otherwise, configured to determine an actual flow output from source 30. It is also possible to estimate expected flow based on other inputs and/or parameters. The flow rate available from the source 30 can generally be reduced or increased for various reasons within practical limitations. For example, a source displacement may be lowered to ensure that demanded pump power does not exceed available power from power source 18 at high pump pressures, or to reduced or increase pressures within hydraulic system 26.

Hydraulic cylinders 32*a-c* connect tool 14 to frame 12 via a direct pivot, via a linkage system with each of hydraulic cylinders 32*a-c* forming one member in the linkage system (referring to FIG. 1), or in any other appropriate manner. Each of hydraulic cylinders 32*a-c* includes a tube 40 and a piston assembly (not shown) disposed within tube 40. One of tube 40 and the piston assembly may be pivotally connected to frame 12, while the other of tube 40 and the piston assembly is pivotally connected to tool 14. Tube 40 and/or the piston assembly may alternately be fixedly connected to either frame 12 or work implement 14 or connected between two or more members of frame 12. The piston may include two opposing hydraulic surfaces, one associated with each of the first and second chambers. An imbalance of fluid pressure on the two surfaces may cause the piston assembly to axially move within tube 40. For example, a fluid pressure within the first hydraulic chamber acting on a first hydraulic surface being greater than a fluid pressure within the second hydraulic chamber acting on a second opposing hydraulic surface may cause the piston assembly to displace to increase the effective length of hydraulic cylinders 32*a-c*. Similarly, when a fluid pressure acting on the second hydraulic surface is greater than a fluid pressure acting on the first hydraulic surface, the piston assembly may retract within tube 40 to decrease the effective length of hydraulic cylinders 32*a-c*.

A sealing member (not shown), such as an o-ring, may be connected to the piston to restrict a flow of fluid between an internal wall of tube 40 and an outer cylindrical surface of the piston. The expansion and retraction of hydraulic cylinders 32*a-c* may function to assist in moving tool 14.

Each of hydraulic cylinders 32*a-c* includes at least one proportional control valve 44 that functions to meter pressurized fluid from source 30 to one of the first and second hydraulic chambers, and at least one drain valve (not shown) that functions to allow fluid from the other of the first and second chambers to drain to tank 28. In an embodiment, proportional control valve 44 includes a spring biased proportional valve mechanism that is solenoid actuated and configured to move between a first position at which fluid is allowed to flow into one of the first and second chambers and a second position at which fluid flow is blocked from the first and second chambers. The location of the valve mechanism between the first and second positions determines a flow rate of the pressurized fluid directed into the associated first and second chambers. The valve mechanism is movable between the first and second positions in response to a demanded flow rate that produces a desired movement of tool 14. The drain valve typically includes a spring biased valve mechanism that is solenoid-actuated and configured to move between a first position at which fluid is allowed to flow from the first and second chambers and a second position at which fluid is blocked from flowing from the first and second chambers. Although the illustrated example employs solenoid valves, the proportional control valve 44 and the drain valve may alternately be hydraulically actuated, mechanically actuated, pneumatically actuated, or actuated in another suitable manner.

With respect to driving the machine 10, motor 34 may be a variable displacement motor or a fixed displacement motor and is configured to receive a flow of pressurized fluid from source 30. The flow of pressurized fluid through motor 34 causes an output shaft 46 connected to traction device 20 to rotate, thereby propelling and/or steering the machine 10. The motor 34 may alternately be indirectly connected to traction device 20 via a gearbox or in any other manner known in the art. Motor 34 or other motor may be connected to a different mechanism on machine 10 other than the traction device 20. For example, motor 34 or other motor may be connected to a rotating work implement, a steering mechanism, or other machine mechanism known in the art. Motor 34 may include a proportional control valve 48 that controls a flow rate of the pressurized fluid supplied to motor 34. Proportional control valve 48 may include a spring biased proportional valve mechanism that is solenoid actuated and configured to move between a first position at which fluid is allowed to flow through motor 34 and a second position at which fluid flow is blocked from motor 34. The location of the valve mechanism between the first and second positions determines a flow rate of the pressurized fluid directed through the motor 34.

Control system 36 includes a controller 50 embodied in a single microprocessor or multiple microprocessors and associated standard electronic systems such as buffers, memory, multiplexers, display drivers, power supply circuitry, signal conditioning circuitry, solenoid driver circuitry, etc. for running an application or program, to control the operation of hydraulic system 26. Numerous commercially available microprocessors can be configured to perform the functions of controller 50. It will be appreciated that controller 50 may be embodied in a general machine microprocessor capable of controlling numerous machine functions.

Controller 50 is configured to receive input from operator interface 16 and to control the flow rate of pressurized fluid to hydraulic cylinders 32*a-c* and motor 34 in response to the input. Specifically, controller 50 is in communication with proportional control valves 44 of hydraulic cylinders 32*a-c* via communication lines 52, 54, and 56 respectively, with proportional control valve 48 of motor 34 via a communication line 58, with first operator interface device 22 via a communication line 60, and with second operator interface device 24 via a communication line 62. In the illustrated embodiment, controller 50 receives proportional signals generated by the first operator interface device 22 and selectively actuates one or more of proportional control valves 44 to selectively fill the first or second actuating chambers associated with hydraulic cylinders 32*a-c* to produce the desired tool movement. Controller 50 also receives the proportional signal generated by the second operator interface device 24 and selectively actuates proportional control valve 48 of motor 34 to produce the desired rotational movement of traction device 20.

Controller 50 is in communication with source 30 via a communication line 64 and is configured to change the operation of the source 30 in response to a demand for pressurized fluid. Specifically, controller 50 may be configured to determine a desired flow rate of pressurized fluid that is required to produce machine movements desired by a machine operator (total desired flow rate) and indicated via first and/or second operator interface devices 22, 24. Controller 50 may be further configured to determine a current flow rate of source 30 and a maximum flow capacity of source 30. Controller 50 may be configured to increase the current flow rate of source 30 if the total desired flow rate is greater than the current flow rate and the current flow rate is less than the maximum flow capacity of source 30.

In an embodiment, the controller 50 is also configured to selectively reduce the desired flow rate of pressurized fluid to hydraulic cylinders 32*a-c* and/or motor 34 under certain circumstances as will be described in greater detail. In particular, if the total commanded flow rate exceeds the available flow rate, one or more of hydraulic cylinders 32*a-c* and/or motor 34 will not receive an adequate flow of pressurized fluid and the associated movements of work machine 10 may be unpredictable.

In overview, when controller 50 determines that the total desired flow rate exceeds the available flow rate of source 30, the demanded flow rate for one or more of hydraulic cylinders 32*a-c* and/or motor 34 is reduced by moving the associated proportional control valves 44, 48 towards the second position. This allows a predictable flow of pressurized fluid to be made available to each such entity in response to an input received via operator interface 16, thereby providing predictable machine 10 and tool 14 movement.

From the foregoing, the manner in which the various system hydraulic components interact and are controllable will be appreciated. In the following, the electro-mechanical systems for controlling flow and movement will not be further detailed or referred to, but it will be appreciated that the steps carried out by the controller 50 are implemented using the systems and interrelationships described above.

Figure 4:
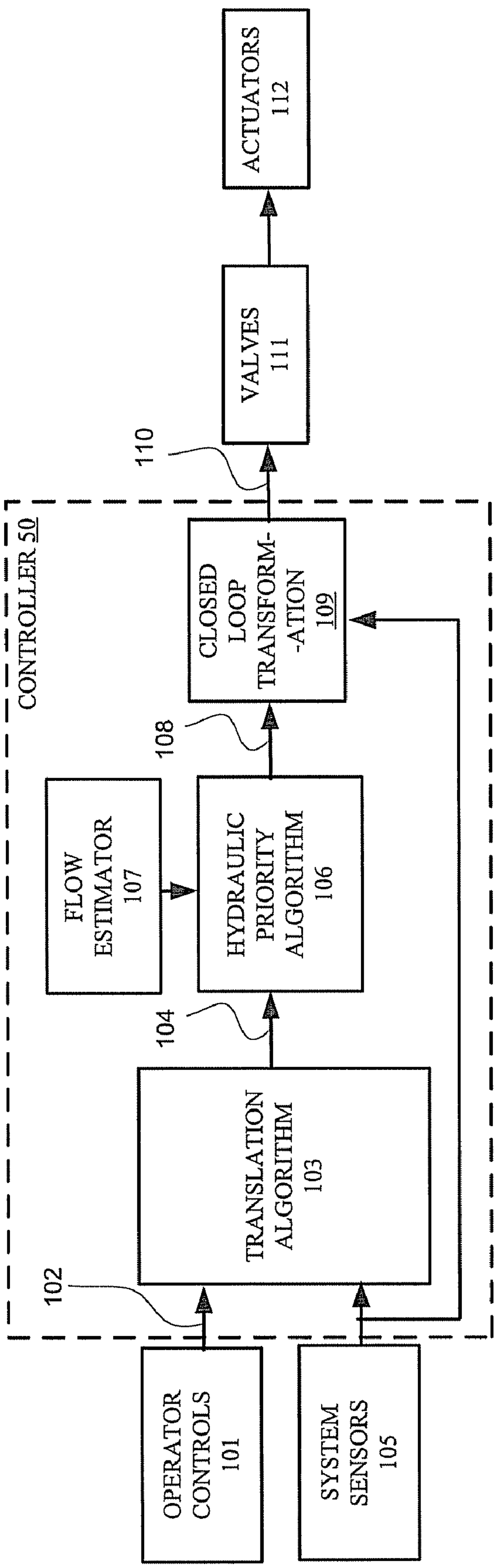
FIG. 4 is a schematic diagram illustrating control circuits of a machine such as illustrated in FIGS. 1 and 2.

FIG. 4 is a schematic diagram 100 illustrating the control circuits of the machine 10 at a conceptual level to aid in understanding the present disclosure. The operator controls 101 provide one or more signals 102 to a translation algorithm (translation module) 103 that outputs valve control commands 104 corresponding to the desired machine movements. It will be appreciated that the algorithm 102 operates in conjunction with input from a number of system sensors 105 as described above as well. The valve control commands 104 are processed via a hydraulic priority algorithm (balancing module) 106, operating in conjunction with data reflecting the available fluid flow from flow estimator 107, to produce adjusted valve commands 108.

The adjusted valve commands 108 are further refined via a closed loop transformation (closed loop transformation module) 109 based on feedback from the system sensors 105. This is necessitated because the valve control commands 104 and adjusted valve commands 108 are empirically based, and the actual operating environment and/or condition of the machine 10 may result in inaccuracies in these values. The closed loop transformation 109 outputs refined valve control signals 110. The refined valve control signals 110 are provided to the appropriate valves 111 to effectuate movement of the associated actuators 112, resulting qualitatively in the desired machine movement, although the magnitude and/or speed of the movement may be reduced from that commanded via the operator controls 101.

Figure 5:
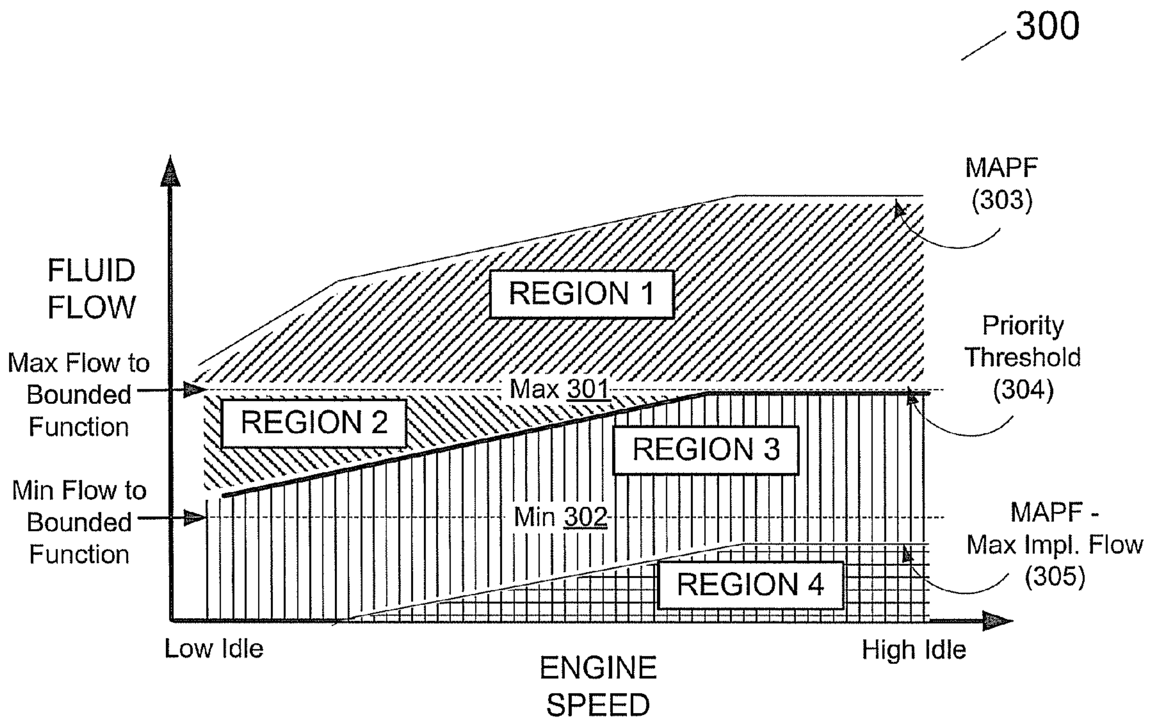
FIG. 5 is a flow allocation plot illustrating allocation of hydraulic flow between a bounded and unbounded implement.

The thresholds governing hydraulic flow priority are illustrated with respect to demanded flows and available fluid flow in the chart 300 of FIG. 5. The chart 300 assumes competition for fluid between two functions, the flow to one of which is bounded between a maximum allowable flow 301 and a minimum allowable flow 302. The amount of fluid flow available for distribution is shown as maximum available flow 303 (MAPF). The maximum available flow 303 may be limited by a mechanical stop or by an electronic stop such as a torque limit, power limit, displacement limit, flow limit, and so on. This curve 303 is linear with engine speed in a middle portion but plateaus at higher engine speeds due to a flow limit. In the illustrated example, maximum available flow 303 also drops off at lower engine speeds due to limitations imposed by an electronic controller.

A priority threshold 304 sets a minimum level of flow to a first implement, such that the flow provided to the first implement will always equal or exceed the priority threshold 304. Although the priority threshold 304 is a function of engine speed in the illustrated example, it may additionally or alternatively be a function of one or more other machine variables or parameters such as machine speed, linkage position, bucket and/or lift arm position, pump speed, pump pressures, etc. Finally, curve 305 illustrates the difference between maximum available flow 303 and a full demanded implement flow to a second (non-bounded) implement.

In operation, the bounded implement is always guaranteed to receive an amount of flow corresponding to the lesser of the demanded flow and the amount of flow set by the priority threshold 304. Thus, the chair 300 represents four regions of operation labeled Region 1, Region 2, Region 3, and Region 4 within which fluid flow priority is adjusted differently. In Region 1, the difference between maximum available flow 303 and the requested flow to the non-bounded implement falls within this region. In this case, there is no need to prioritize the fluid flows between the first (bounded) and second (non-bounded) implements, and each thus receives its requested flow.

In Region 2 (unbounded implement priority region), the system may be flow-limited in that the difference between maximum available flow 303 and the requested flow to the non-bounded implement falls below the maximum flow limit for the bounded implement. Thus, in this region, if the requested flow to the bounded implement exceeds the difference between maximum available flow 303 and the requested flow to the non-bounded implement, the flow to the bounded implement is reduced to the priority threshold 304.

In Region 3 (unbounded implement priority region), the system may again be flow-limited in that the difference between maximum available flow 303 and the requested flow to the non-bounded implement falls below the maximum flow limit for the bounded implement. However, in this region, if the requested flow to the bounded implement exceeds the difference between maximum available flow 303 and the requested flow to the non-bounded implement, the flow to the bounded implement is increased to the priority threshold 304. This increase to the bounded implement flow comes at the expense of the unbounded implement, which now receives a flow that is somewhat less than that requested.

In Region 4 (unbounded implement priority region), the system is not flow-limited in that the difference between maximum available flow 303 and the requested flow to the non-bounded implement is greater than the flow requested for the bounded implement. In this region, each implement receives its requested flow.

Figure 6:
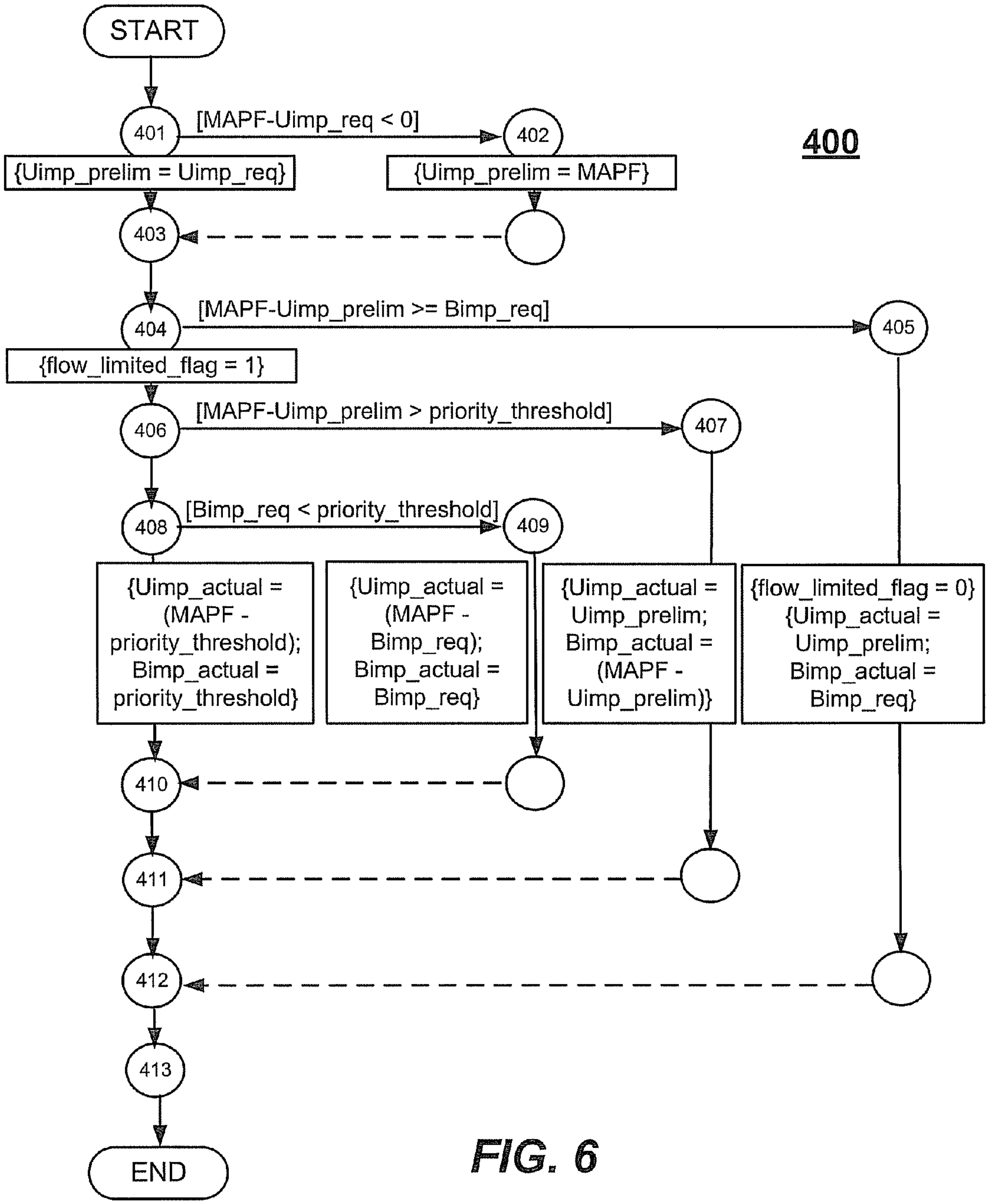
FIG. 6 is a flow chart illustrating an exemplary process usable by a controller for allocating fluid flow between a bounded and unbounded implement within a machine such as illustrated in FIGS. 1 and 2.

In an embodiment, the controller 50 implements the priority system shown in chart 300 to control a bounded implement and at least one unbounded implement. The resulting control instructions executed by the controller 50 are illustrated diagrammatically via the flow chart 400 of FIG. 6. At an initial state 401, the controller determines whether the difference between the MAPF and the unbounded implement flow request (Uimp_req) is less than 0, i.e. whether there is insufficient flow available to satisfy even the requested flow for the unbounded implement. If this condition is met, the process flows to state 402 and the controller 50 sets a preliminary unbounded implement flow (Uimp_prelim) equal to the maximum available flow and flows to state 403. Otherwise, the process flows directly to state 403 and sets the preliminary unbounded implement flow (Uimp_prelim) equal to the unbounded implement flow request (Uimp_req).

At state 403, the controller 50 determines whether the difference between the MAPF and the preliminary unbounded implement flow (Uimp_prelim) is greater than or equal to a bounded implement flow request (Bimp_req). If this condition is met, the process 400 flows to state 405, sets a flow limit flag (flow_limited_flag) equal to zero, sets an actual unbounded implement flow (Uimp_actual) equal to the preliminary unbounded implement flow (Uimp_prelim), sets an actual bounded implement flow (Bimp_actual) equal to the requested bounded implement flow (Bimp_req), and flows to state 412.

If at state 403 the condition was not met, then the process 400 sets the flow limit flag (flow_limited_flag) equal to one and flows to state 406. At state 406, the controller 50 determines whether the difference between the MAPF and the preliminary unbounded implement flow (Uimp_prelim) exceeds a priority threshold (priority_threshold). If this condition is met, the process 400 flows to state 407. At state 407, the process 400 sets actual unbounded implement flow (Uimp_actual) equal to the preliminary unbounded implement flow (Uimp_prelim), actual bounded implement flow (Bimp_actual) equal to the difference between the maximum available flow and the preliminary unbounded implement flow (Uimp_prelim), and flows to state 411. Otherwise, the process flows directly from state 406 to state 408.

At state 408, the process 400 determines whether the bounded implement flow requested (Bimp_req) is less than the priority threshold (priority_threshold). If this condition is met, the process 400 flows to state 409. At state 409, the process 400 sets the actual unbounded implement flow (Uimp_actual) equal to the difference between the maximum available flow and the bounded implement flow requested (Bimp_req). In addition, the controller 50 sets the actual bounded implement flow (Bimp_actual) equal to the bounded implement flow requested (Bimp_req). From state 409, the process 400 flows to state 410.

If the condition at state 408 is not met, the process 400 sets the actual unbounded implement flow (Uimp_actual) equal to the difference between the maximum available flow and the priority threshold (priority_threshold), sets the actual bounded implement flow (Bimp_actual) equal to the priority threshold (priority_threshold), and flows to state 410.

Thus, it can be seen that the actual unbounded implement flow (Uimp_actual) and actual bounded implement flow (Bimp_actual) will be set to one of four combinations depending upon the maximum available flow, the priority threshold 304, and the operator-requested flow levels. In the first combination, there is adequate flow to meet all requests and the flow is not deemed to be limited. In the remaining three combinations, the flow is deemed to be limited, and the actual bounded implement flow (Bimp·actual) will be set to the priority threshold 304, the requested flow, or another value that is a function of the maximum available flow and the unbounded implement flow request (Uimp_req). In this manner, the flow provided to the bounded implement is never less than the lesser of the priority threshold and the actual flow requested for that implement.

In an embodiment, the bounded implement comprises one or more steering actuators for steering the machine 10, and the unbounded implement comprises another actuator or set of actuators, such as may be associated with a tilt function, lift function, etc. The upper bound 301 on the priority threshold 304 in this embodiment is a maximum flow that the steering actuators can accommodate. The lower bound 302 on the priority threshold 304 in this embodiment is a minimum acceptable flow for the steering actuators, such as that set by ISO 5010. Thus, the actual flow to the steering actuators will not exceed the maximum acceptable flow, nor will it decrease below the mandated minimum set by ISO 5010.

In operation, this results in at least acceptable steering ability for safety and operator experience purposes without causing sluggish operation with respect to other implements while steering, and without causing undesirably slow steering while operating other implements simultaneously. Thus, for example, in the case of a steerable machine having a bucket being used for loading material into a truck or container, the machine may be freely and safely steered while in motion at the same time that the bucket is being raised, lowered, or tilted.

INDUSTRIAL APPLICABILITY

The industrial applicability of the bounded hydraulic flow control system described herein will be readily appreciated from the foregoing discussion. A technique is described wherein the flow of hydraulic fluid to a bounded flow implement such as one or more steering actuators and an unbounded flow implement such as a bucket tilt/lift/lower actuator are controlled to maintain the flow to the bounded flow implement within predefined bounds while setting the flow to the unbounded flow implement to the remaining available flow or the requested flow for the unbounded flow implement.

The disclosed hydraulic system is applicable to any hydraulically actuated machine that includes a plurality of fluidly connected hydraulic actuators where flow sharing is desired to alleviate unpredictable and undesirable movements of the machine. Nonexhaustive examples of machines within which the disclosed principles may be used include landfill compactors, backhoe loaders, wheel loaders, motor graders, wheel dozers, articulated trucks and the like. The disclosed hydraulic system apportions an available flow rate (for example, a maximum available flow) of a source of pressurized fluid among the plurality of fluidly connected hydraulic actuators dynamically according to the requested flow amounts as well as a priority threshold 304 for the bounded implement. In this manner, predictable operation of machine 10 and/or tool 14 is maintained, while keeping the fluid flow to the bounded implement from exceeding a maximum allowable flow or from falling below a predefined priority threshold curve 304.

During operation of machine 10, a machine operator manipulates first and/or second operator interface devices 22, 24 to create a desired movement of the machine 10. Throughout this process, first and second operator interface devices 22, 24 generate signals indicative of desired flow rates of fluid supplied to hydraulic cylinders 32*a-c* and/or motor 34 to accomplish the desired movements. After receiving these signals, controller 50 executes the process of flow chart 400 in keeping with plot 300 to generate actual flow request commands to move the implements in question.

It will be appreciated that the foregoing description provides examples of the disclosed system and technique. However, it is contemplated that other implementations may differ in detail from the foregoing examples. All references to specific examples herein are intended to reference the particular example being discussed at that point and are not intended to imply any limitation as to the scope of the claims or disclosure more generally. All language of distinction and disparagement with respect to certain features of the described system or the art is intended to indicate a lack of preference for those features, but not to exclude such from the scope of the claims entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, the attached claims encompass all modifications and equivalents as permitted by applicable law. Moreover, any combination of the above-described elements in all possible variations thereof is encompassed unless otherwise indicated herein or otherwise clearly contradicted by context.

We claim:

1. A machine controller for controlling a flow of hydraulic fluid to each of two actuators associated with a machine, wherein one of the actuators is a bounded actuator, the fluid flow of which is constrained to remain between an upper and lower bound, and a non-bounded actuator, the controller comprising:

a control input for receiving operator commands related to desired bounded and non-bounded actuator movements;

a translation module for translating the operator commands into a first valve control command associated with the bounded actuator and a second valve control command associated with the non-bounded actuator; and a balancing module configured to reduce the first valve control command to form a first adjusted valve control command if an available flow of hydraulic fluid is insufficient to service the first and second valve control commands, and if the difference between the available flow and a flow associated with the second valve control command is less than a flow corresponding to the first valve control command, wherein the first adjusted valve control command is the lesser of the first valve control command and a nonlinear threshold function of machine engine speed.

2. The controller according to claim 1, wherein the first adjusted valve control command corresponds to a point on the threshold function when the first valve control command exceeds the threshold function and the difference between the maximum available flow and a flow corresponding to the second valve control command is less than the threshold function.

3. The controller according to claim 1, wherein the first adjusted valve control command corresponds to the first valve control command when the difference between the maximum available flow and the flow associated with the second valve control command is greater than a flow associated with the first adjusted valve control command.

4. The controller according to claim 1, further comprising a closed loop transformation module for modifying the first adjusted valve control command responsive to system sensor data to improve the accuracy of the first adjusted valve control command.

5. The controller according to claim 1, wherein the operator commands originate from one or more operator-actuated controls.

6. The controller according to claim 5, wherein the one or more operator-actuated controls include at least a pedal control and a multi-axis operator interface device.

7. The controller according to claim 1, wherein the threshold flow rate as a function of the engine speed includes two contiguous linear portions, including a first linearly increasing portion that increases to a maximum value and a second constant portion at the maximum value.

8. The controller according to claim 1, wherein the translation module and balancing module include computer-readable instructions recorded on a computer-readable medium, the controller further including at least one microprocessor for executing the computer-readable instructions.

9. The controller according to claim 8, further including a second microprocessor for executing the computer-readable instructions.

10. The controller according to claim 8, wherein the balancing module is linked to a flow estimator to receive an estimate of available fluid flow.

11. The controller according to claim 1, wherein each of the actuators is one of a hydraulic cylinder and a fluid motor.

12. A method of allocating hydraulic fluid between a first and second hydraulic actuator in a machine having an engine having a speed, wherein the engine is linked to a pressurized fluid source to provide pressurized fluid to the first and second hydraulic actuators, wherein the first hydraulic actuator is a bounded actuator, the fluid flow of which is constrained to remain between an upper and lower bound, and the second hydraulic actuator is a non-bounded actuator, the method comprising:

receiving a first command to provide a first requested fluid flow to the bounded actuator and a second command to provide a second requested fluid flow to the non-bounded actuator;

identifying a nonlinear threshold curve that specifies fluid flows as a function of engine speed; and reducing the first and second commands to produce modified first and second commands for producing modified first and second fluid flows, such that (1) the sum of the modified first and second fluid flows is less than or equal to an available fluid flow, and (2) the modified first flow meets or exceeds the lesser of the first requested fluid flow and a current fluid flow specified by the threshold curve.

13. The method according to claim 12, wherein all points on the threshold curve meet or exceed a predetermined minimum value.

14. The method according to claim 13, wherein the predetermined minimum value corresponds to ISO 5010.

15. The method according to claim 12, wherein reducing the first and second commands comprises determining whether the current available flow from the pressurized fluid source is sufficient to provide the first and second fluid flows and setting the adjusted first and second fluid flows equal to the first and second fluid flows if the sum of the first and second fluid flows does not exceed the maximum available flow.

16. The method according to claim 12, wherein reducing the first fluid flow further includes reducing the second fluid flow to the difference between the current available flow and the modified first fluid flow.

17. The method according to claim 12, further comprising reducing the second fluid flow such that the sum of the first and second fluid flows is equal to the current available flow if (1) the first fluid flow is less than the threshold curve and (2) the sum of the first and second fluid flows exceeds the maximum available flow.

18. A machine having a hydraulic priority system for controlling hydraulic fluid flow among multiple hydraulic actuators, the machine comprising:

a power source and a hydraulic pump linked to the power source for providing a current available fluid flow;

at least one bounded actuator, the fluid flow of which is constrained to remain between an upper and lower bound;

at least one non-bounded actuator, the fluid flow of which is not bounded except by the current available fluid flow;

at least one valve associated with each actuator for controlling the flow of hydraulic fluid to the actuator;

at least one control input for allowing an operator to indicate first and second desired fluid flows respectively for the bounded and non-bounded actuators;

and a controller for receiving from the control input an indication of the first and second desired fluid flows, and modifying the first desired fluid flow to a modified first fluid flow based on the current available fluid flow and a nonlinear threshold curve that specifies a fluid flow as a function of a second variable.

19. The machine according to claim 18, wherein the power source is an engine and the second variable is engine speed.

20. The machine according to claim 18, wherein the modified first fluid flow is equal to the current value of the nonlinear threshold curve, if the first desired fluid flow is greater than the current value of the nonlinear threshold curve, and if the first desired fluid flow exceeds the difference between the available flow and the second desired fluid flow.

* * * * *